No. 782,148. Patented February 7, 1905.

UNITED STATES PATENT OFFICE.

ANTON P. LEPU, OF GREENSBURG, KANSAS.

ARTIFICIAL FUEL.

SPECIFICATION forming part of Letters Patent No. 782,148, dated February 7, 1905.

Application filed March 4, 1904. Serial No. 196,550.

*To all whom it may concern:*

Be it known that I, ANTON P. LEPU, a citizen of the United States, residing at Greensburg, in the county of Kiowa and State of Kansas, have invented new and useful Improvements in Artificial Fuel, of which the following is a specification.

This invention relates to an artificial fuel of an inexpensive and simple nature having heating characteristics materially superior to coal and other standard natural fuels now in use and also more economical and lasting in its combustion and consumption.

The main object of the improved fuel is to utilize waste or refuse materials and other substances that can be readily obtained at a minimum cost.

The composition includes as its essential elements coal dust or refuse, earth, chlorid of sodium, and sodium hydrate. The proportions to the ton of the foregoing components are one-half each of coal dust or refuse and earth, two hundred pounds of chlorid of sodium, and two hundred ounces of sodium hydrate. These proportions, however, may be varied at will, and in mixing the same the coal dust or refuse and earth are first thoroughly commingled, the salt is then added, and finally the sodium hydrate. The coal dust or refuse and earth are mixed in dry condition and the chlorid of sodium or salt and lye are placed in a suitable quantity of water and poured into or on the mixed coal dust or refuse and earth to form a mortar or mud-like substance. The moist substance or mass may be used immediately without further treatment; but it is intended that in many instances it be molded into briquet form and permitted to dry. It will be understood that when the fuel is produced in the form of briquets it will be more conveniently marketable.

The use of chlorid of sodium in the composition set forth has the effect of preventing too rapid consumption, or, in other words, prolongs the combustion of the fuel with advantage in economical use of the same. The chlorid of sodium in its stronger aspect of an absolute preventive of combustion is deteriorated by the other constituents to produce a slow-burning fuel.

In some instances it is proposed to add to the composition stated ashes, slag, or other analogous material, such as cinders, to give the fuel a body with advantage in consumption thereof under certain economical conditions and to meet requirements demanded in certain fuel uses.

It will be seen that the materials embodied in the fuel can be obtained most anywhere at a small cost, and the cost of manufacture is therefore reduced to a minimum. In the from of briquets the fuel may be readily transported or stored, and it will be understood that the dimensions of the briquets may be varied at will. Furthermore, instead of molding the moist mass into briquets it may be otherwise treated to separate the same into lumps or particles, if a specific demand may require such production thereof.

Having thus fully described the invention, what is claimed as new is—

An artificial fuel consisting of coal dust or refuse, earth, chlorid of sodium, and sodium hydrate, in the proportion to the ton of two hundred pounds of chlorid of sodium, two hundred ounces of sodium hydrate, one half the remainder in coal dust or refuse and the other half of the remainder in earth.

In testimony whereof I affix my signature in presence of two witnesses.

ANTON P. LEPU.

Witnesses:
   KATHARINE ALLEN,
   GEORGE M. BOND.